(12) United States Patent
Ku et al.

(10) Patent No.: US 11,129,050 B2
(45) Date of Patent: *Sep. 21, 2021

(54) METHOD AND DEVICE BY WHICH TERMINAL PERFORMS FREQUENCY MEASUREMENT

(71) Applicant: LG ELECTRONICS INC., Seoul (KR)

(72) Inventors: Gwanmo Ku, Seoul (KR); Sunghoon Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1 day.

This patent is subject to a terminal disclaimer.

(21) Appl. No.: 16/738,765

(22) Filed: Jan. 9, 2020

(65) Prior Publication Data

US 2020/0154316 A1    May 14, 2020

Related U.S. Application Data

(63) Continuation of application No. 15/760,565, filed as application No. PCT/KR2016/010149 on Sep. 9, 2016, now Pat. No. 10,560,869.

(Continued)

(51) Int. Cl.
*H04W 28/08* (2009.01)
*H04W 36/22* (2009.01)
(Continued)

(52) U.S. Cl.
CPC ....... *H04W 28/08* (2013.01); *H04W 36/0083* (2013.01); *H04W 36/22* (2013.01);
(Continued)

(58) Field of Classification Search
None
See application file for complete search history.

(56) References Cited

U.S. PATENT DOCUMENTS

2014/0036874 A1    2/2014  Jeong et al.
2014/0341059 A1   11/2014  Jang et al.
(Continued)

FOREIGN PATENT DOCUMENTS

CN      102932744       2/2013
KR    1020130053378     5/2013
(Continued)

OTHER PUBLICATIONS

European Patent Office Application Serial No. 16846811.4, Search Report dated Jan. 4, 2019, 13 pages.

(Continued)

*Primary Examiner* — Kodzovi Acolatse
(74) *Attorney, Agent, or Firm* — Lee, Hong, Degerman, Kang & Waimey

(57) ABSTRACT

A method by which a terminal performs frequency measurement in a wireless communication system, and a device supporting the same are provided. The terminal can receive a distribution parameter from a serving cell and performs, on the basis of the received distribution parameter, frequency measurement on a neighboring frequency having a lower or the same priority as that of a serving frequency regardless of a cell selection condition of the serving cell.

6 Claims, 9 Drawing Sheets

Related U.S. Application Data

(60) Provisional application No. 62/219,137, filed on Sep. 16, 2015, provisional application No. 62/251,111, filed on Nov. 5, 2015.

(51) Int. Cl.
   *H04W 36/30* (2009.01)
   *H04W 36/00* (2009.01)
   *H04W 88/02* (2009.01)
   *H04W 36/04* (2009.01)
   *H04W 48/20* (2009.01)

(52) U.S. Cl.
   CPC .......... *H04W 36/30* (2013.01); *H04W 88/02* (2013.01); *H04W 36/04* (2013.01); *H04W 48/20* (2013.01)

(56) References Cited

U.S. PATENT DOCUMENTS

| | | |
|---|---|---|
| 2015/0029917 A1 | 1/2015 | Kim |
| 2015/0099517 A1 | 4/2015 | Wang et al. |
| 2015/0223126 A1 | 8/2015 | Jung et al. |
| 2015/0271806 A1 | 9/2015 | Kim et al. |
| 2016/0286445 A1 | 9/2016 | Jung et al. |
| 2017/0276712 A1 | 9/2017 | Midori et al. |
| 2017/0289849 A1* | 10/2017 | Yiu ............... H04W 28/08 |
| 2017/0373739 A1 | 12/2017 | Guo et al. |
| 2018/0035342 A1* | 2/2018 | Fujishiro ............... H04W 36/24 |
| 2018/0220330 A1* | 8/2018 | Van Der Velde ..... H04W 24/08 |
| 2018/0262953 A1 | 9/2018 | Ku et al. |
| 2018/0288666 A1* | 10/2018 | Fujishiro ............... H04W 68/00 |

FOREIGN PATENT DOCUMENTS

| | | |
|---|---|---|
| KR | 1020140024459 | 2/2014 |
| WO | 2009038368 | 3/2009 |
| WO | 2015069064 | 5/2015 |

OTHER PUBLICATIONS

Japan Patent Office Application No. 2018-514340, Office Action dated Feb. 5, 2019, 3 pages.
LG Electronics, "Idle mode load balancing in Het Nets", 3GPP TSG RAN WG2 Meeting #89bis, R2-151659, Apr. 2015, 2 pages.
Ericsson, et al., "Cell-specific prioritization for idle mode load balancing", 3GPP TSG RAN WG2 Meeting #87, R2-143333, Aug. 2014, 6 pages.
Ericsson, et al., "Cell-specific prioritisation at reselection", 3GPP TSG RAN WG2 Meeting #82, R2-131668, May 2013, 5 pages.
Alcatel-Lucent, et al., "Idle UE Distribution in Macro Only System and HetNets", 3GPP TSG RAN WG2 Meeting #86, R2-142495, May 2014, 6 pages.
3rd Generation Partnership Project (3GPP), "Technical Specification Group Radio Access Network; UE Procedures in Idle Mode and Procedures for Cell Reselection in Connected Mode (Release 1999)," 3GPP TS 25.304 V3.3.0, Jun. 2000, 45 pages.
United States Patent and Trademark Office U.S. Appl. No. 15/760,565, Office Action dated Nov. 30, 2018, 14 pages.
United States Patent and Trademark Office U.S. Appl. No. 15/760,565, Final Office Action dated Apr. 2, 2019, 15 pages.
State Intellectual Property Office of the People's Republic of China Application Serial No. 201680053956.5, Office Action dated Apr. 14, 2020, 7 pages.
PCT International Application No. PCT/KR2016/010149, International Search Report dated Dec. 5, 2016, 4 pages.
3rd Generation Partnership Project (3GPP), "Technical Specification Group Radio Access Network; Evolved Universal Terrestrial Radio Access (E-UTRA); User Equipment (UE) procedures in idle mode (Release 12)," Section 5.2.4 of 3GPP TS 36.304 V124.0, Mar. 2015, 13 pages.

* cited by examiner

METHOD AND DEVICE BY WHICH TERMINAL PERFORMS FREQUENCY MEASUREMENT

CROSS-REFERENCE TO RELATED APPLICATIONS

This application is a continuation of U.S. patent application Ser. No. 15/760,565, filed on Mar. 15, 2018, now U.S. Pat. No. 10,560,869, which is the National Stage filing under 35 U.S.C. 371 of International Application No. PCT/KR2016/010149, filed on Sep. 9, 2016, which claims the benefit of U.S. Provisional Application No. 62/219,137, filed on Sep. 16, 2015, and 62/251,111, filed on Nov. 5, 2015, the contents of which are all hereby incorporated by reference herein in its entirety.

BACKGROUND OF THE INVENTION

Field of the Invention

The present invention relates to a wireless communication system, and more particularly, to a method for a UE to perform frequency measurement, and a device supporting the same.

Related Art

3GPP (3rUEd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Cellular is concept proposed to overcome a restriction of a service region and a limitation of a frequency and subscriber capacity. This is a method of providing communication coverage by changing single high-power base station to a plurality of low-power base stations. That is, a mobile communication service region is divided in unit of several small cells so that different frequencies are assigned to adjacent cells, and two cells which are sufficiently spaced apart from each other and thus have no interference occurrence use the same frequency band to spatially reuse a frequency.

Meanwhile, there may be a particularly high communication demand in a specific region such as a hotspot inside a cell, and reception sensitivity of radio waves may deteriorate in a specific region such as a cell edge or a coverage hole. With the advance of a wireless communication technique, a small cell may be installed inside a macrocell for the purpose of enabling communication in the hotspot, the cell edge, and the coverage hole. A pico cell, a femto cell, a microcell, or the like is a type of the small cell. The small cell may be located inside or outside the macrocell. In this case, the small cell may be located at a position where the macrocell does not reach, or may be located indoors or at the office. Such a network may be called a heterogeneous network (HetNet). In this case, the heterogeneous network does not have to use different radio access mechanisms. In a heterogeneous network environment, the macrocell is a relatively large coverage cell, and the small cell such as the femtocell and the picocell is a small coverage cell. The macrocell and the small cell may serve to distribute the same traffic or transmit traffic of different QoS. In the heterogeneous network environment, coverage overlapping may occur between the plurality of macrocells and small cells.

SUMMARY OF THE INVENTION

A load distribution mechanism based on the frequency-specific priority and the redistribution probability for a frequency (hereinafter, "frequency priority with probability (FPP)-based mechanism") can distribute loads between individual carriers but may not guarantee load distribution in a cell level. On the contrary, a load distribution mechanism based on the cell-specific priority (hereinafter, "cell-specific priority (CSP)-based mechanism") can distribute loads in a cell level but may not guarantee to partially distribute loads between different cells. Therefore, it is needed to propose a new load distribution mechanism. Further, a new criterion for frequency measurement needs to be proposed in order to detect a cell for load distribution.

According to an embodiment, there is provided a method for a UE to perform frequency measurement in a wireless communication system. The UE may include: receiving a distribution parameter from a serving cell; and performing, based on the received distribution parameter, frequency measurement on a neighboring frequency having a priority lower than or equal to that of a serving frequency regardless of a cell selection condition of the serving cell.

The cell selection condition of the serving cell may be a condition such that a cell selection RX level (Srxlev) of the serving cell and a cell selection quality (Squal) of the serving cell have a positive value.

The distribution parameter may include a redistribution factor set for each frequency. The frequency measurement may be performed on a frequency for which the redistribution factor is set. The neighboring frequency may be either an inter-frequency or an inter-RAT frequency. The neighboring frequency may be the frequency for which the redistribution factor is set. The serving frequency may be a frequency to which the serving cell belongs.

The distribution parameter may include a list of specified cells for each frequency. The frequency measurement may be performed on a frequency to which the specified cells belong. The neighboring frequency may be either an inter-frequency or an inter-RAT frequency. The neighboring frequency may be the frequency to which the specified cells belong.

The distribution parameter may include a frequency-specific priority set for each frequency.

The distribution parameter may be received via a system information block.

According to an embodiment, there is provided a UE for performing frequency measurement in a wireless communication system. The UE may include: a memory; a transceiver; and a processor to connect the memory and the transceiver, wherein the processor may be configured to: control the transceiver to receive a distribution parameter from a serving cell; and perform, based on the received distribution parameter, frequency measurement on a neighboring frequency having a priority lower than or equal to that of a serving frequency regardless of a cell selection condition of the serving cell.

The cell selection condition of the serving cell may be a condition such that a cell selection RX level (Srxlev) of the serving cell and a cell selection quality (Squal) of the serving cell have a positive value.

It is possible to efficiently perform multicarrier load distribution.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
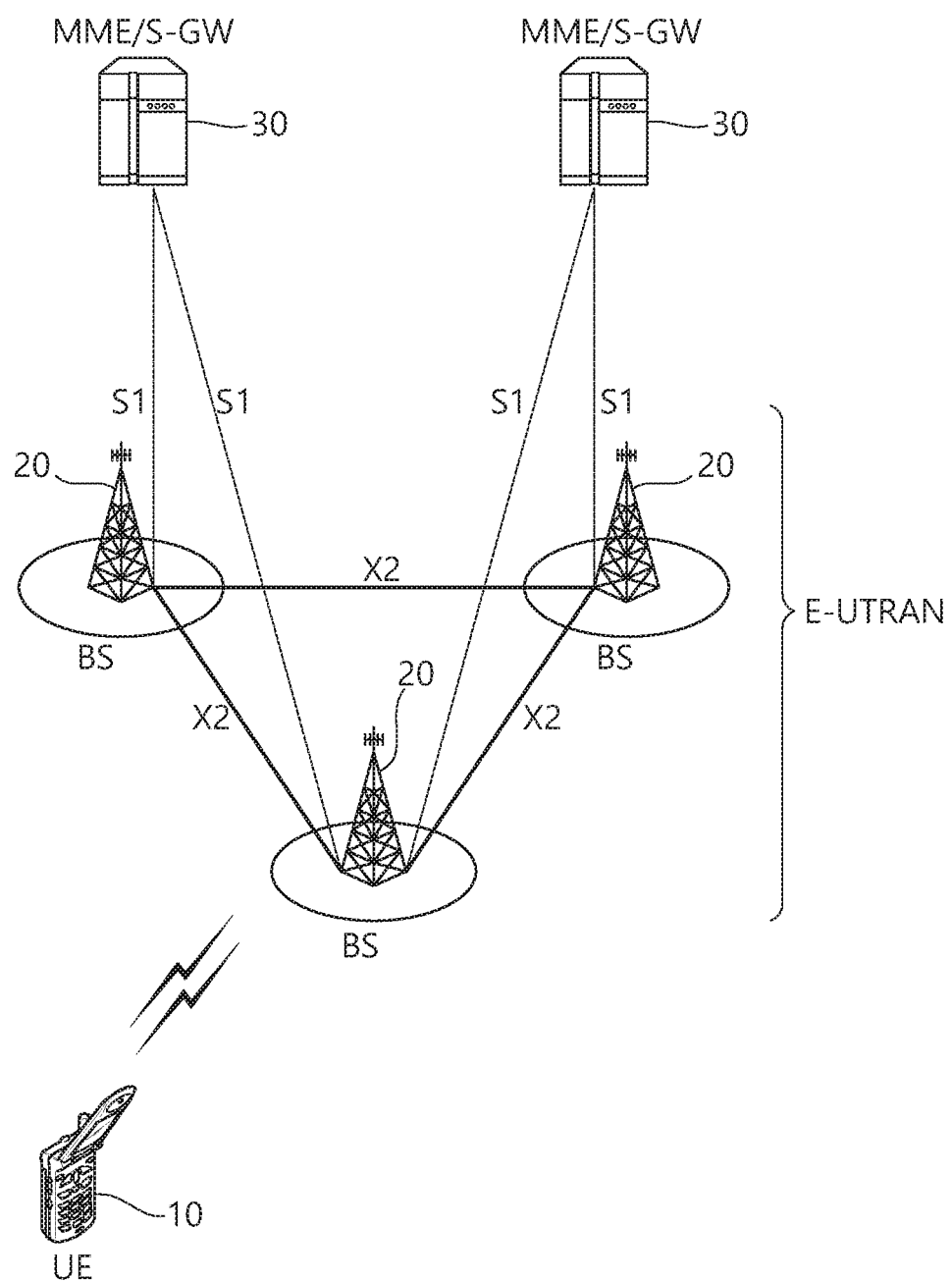
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
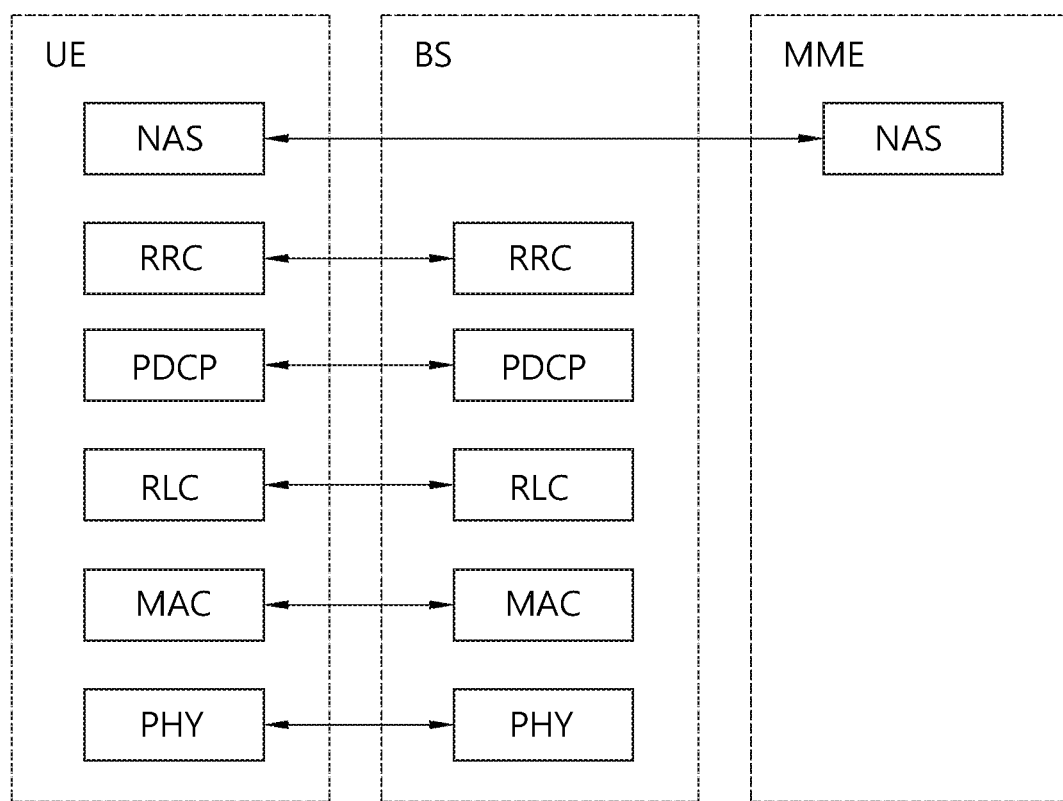
FIG. 2 shows a control plane of a radio interface protocol of an LTE system.
Figure 3:
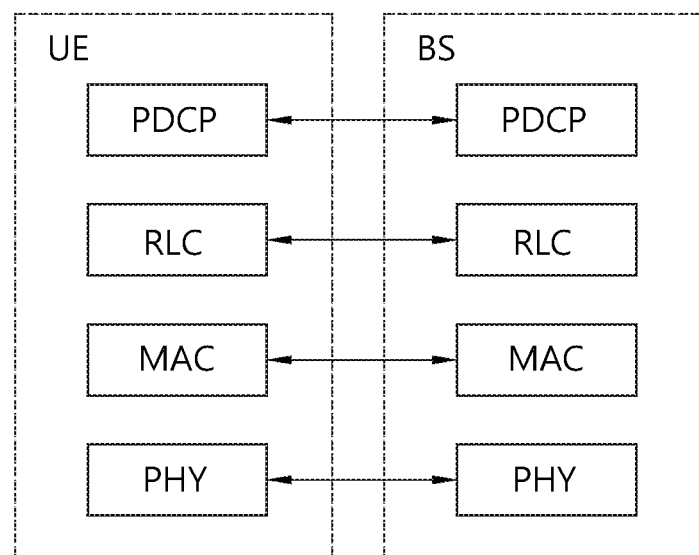
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, an RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
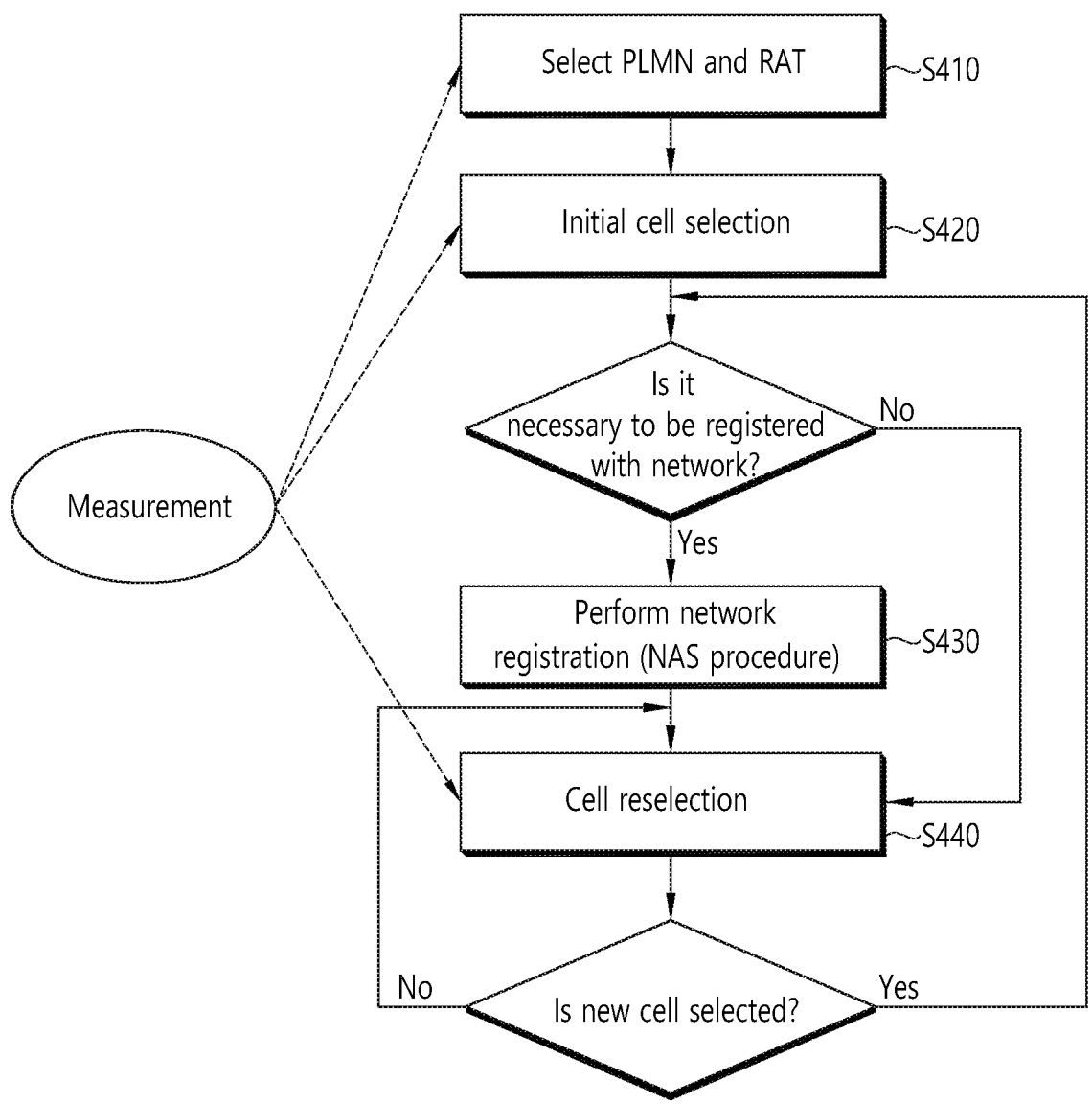
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Hereinafter, a Method and a Procedure of Selecting a Cell by a UE in a 3GPP LTE is Described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved through such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: A UE reselects a cell having a different center frequency from that of RAT, such as a cell on which the UE camps on Inter-RAT cell reselection: A UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured a UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide a UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide a UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, \quad R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by a UE, Qmeas,n is the quality value of the neighbor cell measured by UE, Qhyst is the hysteresis value for ranking, and Qoffset is an offset between the two cells.

In Intra-frequency, if a UE receives an offset "Qoffsets,n" between a serving cell and a neighbor cell, Qoffset=Qoffsets,n. If a UE does not Qoffsets,n, Qoffset=0.

In Inter-frequency, if a UE receives an offset "Qoffsets,n" for a corresponding cell, Qoffset=Qoffsets,n+Qfrequency. If a UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and a UE may alternately reselect the twos. Qhyst is a parameter that gives hysteresis to cell reselection so that UE is prevented from to alternately reselecting two cells.

A UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Hereinafter, a cell selection criterion S will be described.

A UE may calculate the ranking of any cell satisfying a cell selection criterion S. The cell selection criterion may be defined by Equation 2.

$$Srxlev > 0 \text{ and } Squal > 0$$ [Equation 2]

Srxlev denotes a cell selection RX level value (dB), which may be defined by Equation 3. Squal denotes a cell selection quality value (dB), which may be defined by Equation 4.

$$Srxlev = Qrxlevmeas - (Qrxlevmin + Qrxlevminoffset) - Pcompensation - Qoffsettemp$$ [Equation 3]

Qrxlevmeas denotes a downlink reception power value used when the UE actually measures an RX channel, Qrxlevmin denotes a minimum downlink receiver power requirement level required to select a corresponding cell, Qrxlevminoffset denotes a threshold value to be added to Qrxlevmin only when the UE periodically searches for a public land mobile network (PLMN, or a communication vendor) having a higher priority while being present in a visited public land mobile network (VPLMN), Pcompensation is a threshold value considering an uplink channel state, and Qoffsettemp is an offset temporarily applied to the cell.

$$Squal = Qqualmeas - (Qqualmin + Qqualminoffset) - Qoffsettemp$$ [Equation 4]

Qqualmeas denotes a value obtained by calculating a ratio of received signal strength used when the UE actually measures a downlink RX channel and total noise actually measured. Qqualmin a minimum signal to noise ratio level required to select a corresponding cell. Qqualminoffset denotes a threshold value to be added to Qqualmin only when the UE periodically searches for a PLMN having a higher priority while being present in a VPLMN, and Qoffsettemp is an offset temporarily applied to the cell.

Referring to Equation 2 above, the cell selection criterion may be satisfied when both of Srxlev and Squal are greater than 0. That is, when both of the RSRP and RSRQ of the measured cell are greater than or equal to a specific level, the UE may determine the cell as a cell having a basic possibility for cell reselection. In particular, Squal is a parameter corresponding to the RSRQ. That is, Squal is a value calculated in association with quality of power rather than simply a value associated with a magnitude of power measured in the cell. The cell selection criterion may be satisfied in terms of quality of the cell if Squal>0. The cell selection criterion for the RSRQ may be satisfied only when the measured RSRQ is greater than or equal to a sum of Qqualmin and Qqualminoffset.

Figure 5:
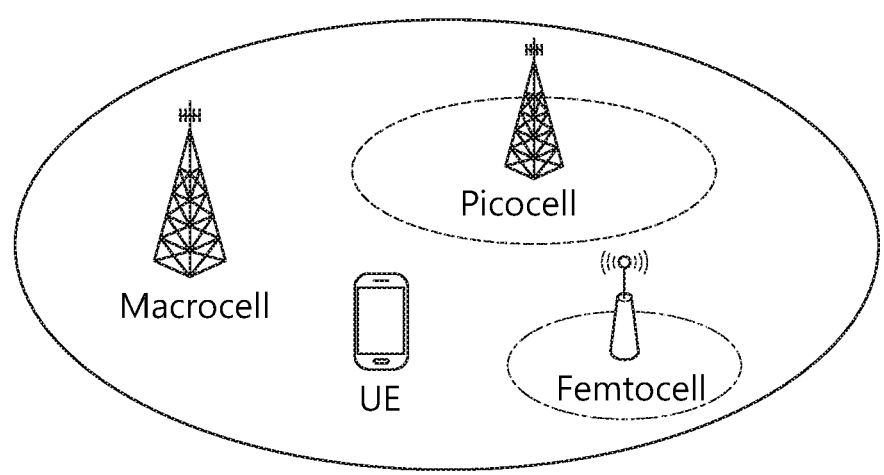
FIG. 5 illustrates an example of a heterogeneous network.

FIG. 5 illustrates an example of a heterogeneous network (HetNet).

Referring to FIG. 5, the heterogeneous network is a network in which different types of cells are mixed and operated. There are many nodes overlapping in the heterogeneous network, which may include a picocell, a microcell, a femtocell or a home BS (eNB). Although the use of small cells is not limited, a picocell may generally be installed in an area with high demand for data services, a femtocell may be installed in an indoor office or home, and a wireless repeater may be installed for supplementing macrocell coverage. Small cells may be classified into a closed subscriber group (CSG) available only to a particular user according to access restriction, an open access group that general users are allowed to access, and a hybrid access group that is a combination of these two types.

Hereinafter, a method of distributing loads in a heterogeneous network environment will be described.

A plurality of frequencies may be deployed in a heterogeneous network. For example, macrocells having different frequencies may be deployed to overlap, and small cells having different frequencies may be deployed to overlap within a macrocell. When the plurality of frequencies is deployed in the heterogeneous network, the network needs to broadcast a distribution parameter for a carrier frequency (for example, a redistribution probability by frequency) via system information in order to redistribute an RRC_IDLE UE. Subsequently, the RRC_IDLE UE may perform an idle mode shift according to the received distribution parameter. For example, when the network broadcasts the redistribution probability by frequency through the system information, the UE may generate a random value among uniformly distributed values ranging from 0 to 1 and may reselect a cell corresponding to the redistribution probability. For a successful idle mode shift, the total sum of redistribution probabilities by frequency needs to be 1.

Load distribution may be performed based on the frequency-specific priority and the redistribution probability for a frequency. Alternatively, load distribution may be performed based on the cell-specific priority. A load distribution method based on the cell-specific priority is one proposed method for solving the problem of the conventional load distribution method based on the frequency-specific priority. The frequency-specific priority is a priority set for each frequency, while the cell-specific priority is a priority set for each cell.

In the present specification, a load distribution mechanism based on the frequency-specific priority and the redistribution probability for a frequency may be referred to as a frequency priority with probability (FPP)-based mechanism. A load distribution mechanism based on the cell-specific priority is referred to as a cell-specific priority (CSP)-based mechanism.

The FPP-based mechanism can distribute loads between individual carriers but may not distribute loads in a cell level. On the contrary, the CSP-based mechanism can distribute loads in a cell level but may not guarantee to partially distribute UEs between different cells. Therefore, a new load distribution mechanism needs to be proposed in order to solve the problem of the FPP-based mechanism that cannot distribute loads in the cell level and the problem of the CSP-based mechanism that does not guarantee partial load distribution between different cells.

Hereinafter, a new load distribution mechanism will be described according to an embodiment of the present invention. Further, a method for a UE to reselect a cell based on the new load distribution mechanism and a device supporting the same will be described. In addition, a method for a UE to perform frequency measurement for cell reselection and a device supporting the same will be described.

The new load distribution mechanism may distribute loads considering the list of specified cells for a frequency in addition to the frequency-specific priority and a probability value for a frequency. The specified cells may be small cells. In the present specification, an FPP that additionally includes a list of specified cells for a frequency may be defined as enhanced-FPP (E-FPP). The E-FPP may include the list of specified cells belonging to the frequency in addition to the FPP. When a UE is set as the E-FPP, the UE needs to detect a specified cell belonging to the frequency. To this end, the UE needs to measure the frequency to which the specified cell belongs. Then, the UE needs to evaluate whether it is necessary to reselect the specified cell.

According to the current measurement rules disclosed in 3GPP TS 36.304 5.2.4.2 'Measurement rules for cell reselection', a UE performs frequency measurement, which is controlled by a related priority between a serving frequency and a target frequency and the signal strength/quality of a serving cell. That is, when the UE set as the E-FPP considers the conventional priority as a frequency reselection priority, the UE may not detect the specified cell. For example, when the frequency including the specified cell has a lower priority than that of another frequency, the UE may not measure the frequency including the specified cell and may not detect the specified cell. Furthermore, the UE may not measure the specified cell. Therefore, a new method for a UE to measure a frequency needs to be proposed.

Figure 6:
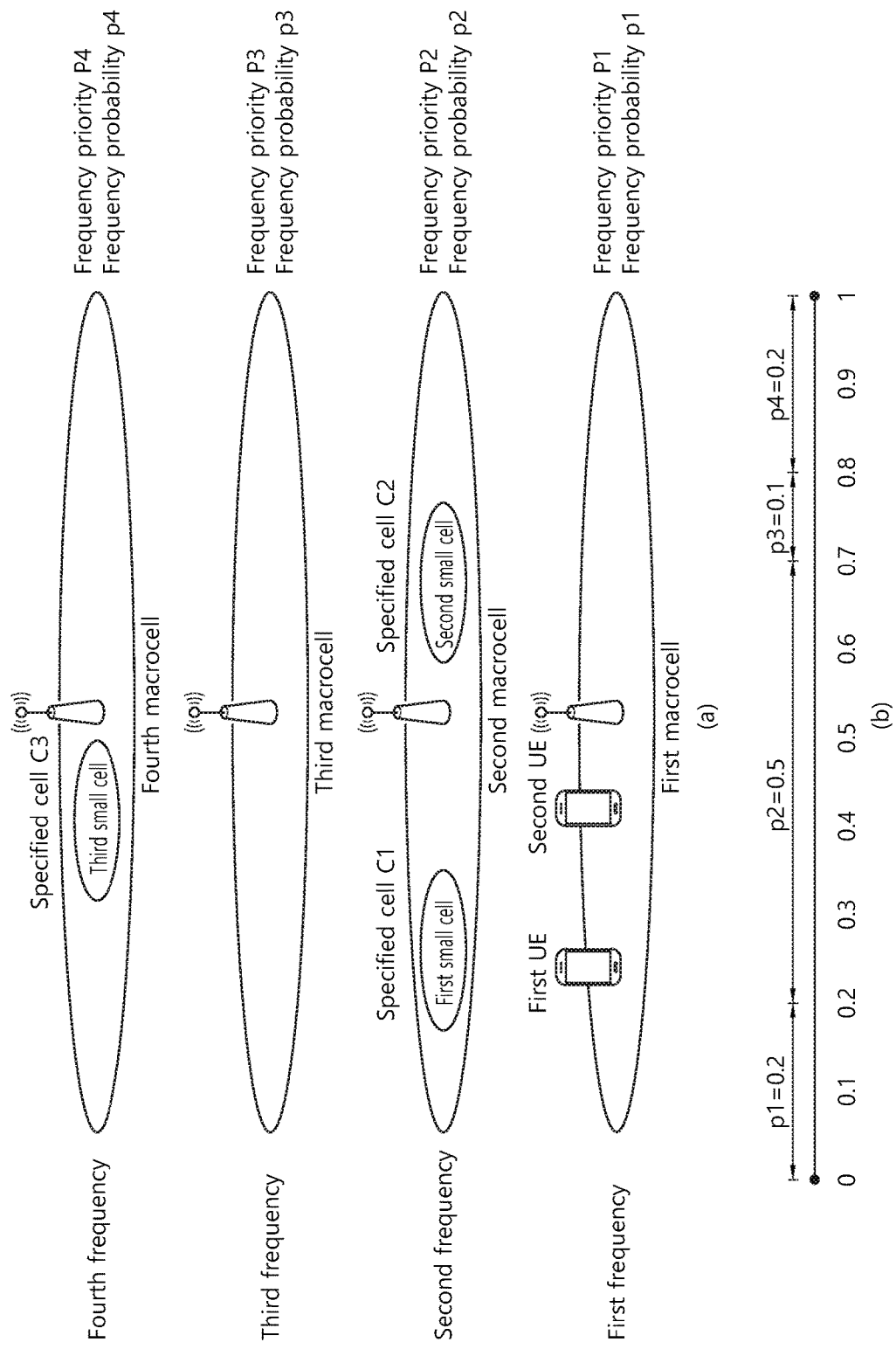
FIG. 6 illustrates a method for a UE to reselect a cell according to an embodiment of the present invention.

FIG. 6 illustrates a method for a UE to perform cell reselection according to an embodiment of the present invention.

(1) Step 1

A UE may receive a distribution parameter.

The distribution parameter may be an FPP for each frequency. That is, the UE may receive a frequency priority and a probability value for each frequency. The FPP may be broadcast by a network. The FPP may be included in a system information block.

The distribution parameter may be an E-FPP for each frequency. That is, the UE may receive a frequency priority and a probability value for each frequency, and may additionally receive a list of specified cells belonging to each frequency. The E-FPP may be broadcast by the network. The E-FPP may be included in the system information block. In the present specification, the probability value may be used to refer to the same concept as that of a redistribution factor or a redistribution probability. The redistribution probability may be derived from intended distribution statistics. The intended distribution statistics may be a set of redistribution factors. The redistribution factor may be a frequency-specific redistribution probability value received from the network to perform load distribution. Alternatively, the redistribution factor may be a cell-specific redistribution probability value received from the network to perform load distribution.

For example, the distribution parameter may be provided as follows. The following example is an illustrative distribution parameter, and the technical idea of the present invention is not limited to the following distribution parameter value.

Frequency priority: Frequency priority P1 for first frequency, frequency priority P2 for second frequency, and frequency priority Pn for nth frequency Redistribution factor: Redistribution factor p1 for first frequency, redistribution element p2 for second frequency, and redistribution factor pn for nth frequency Specified cell: First and second cells for second frequency and third cell for third frequency When the UE receives the distribution parameter, the UE can know a frequency priority for each frequency, a redistribution factor for each frequency, and a specified cell belonging to each frequency.

Referring to FIG. 6(a), it is assumed that the distribution parameter may be provided as follows.

Frequency priority: Frequency priority P1 for first frequency, frequency priority P2 for second frequency, frequency priority P3 for third frequency, and frequency priority P4 for fourth frequency (frequency priority: P2>P4>P1>P3)

Redistribution factor: Redistribution factor 0.2 for first frequency, redistribution factor 0.5 for second frequency, redistribution factor 0.1 for third frequency, and redistribution factor 0.2 for fourth frequency Specified cell: First and second small cells for second frequency and third small cell for fourth frequency

(2) Step 2

When the UE receives the distribution parameter, the UE may start a load distribution mechanism based on the received distribution parameter. Each UE may select a random value from among uniformly distributed values ranging from 0 to 1. Then, each UE may select a carrier frequency associated with the selected random value from among a first frequency to an nth frequency. The probability of the UE being redistributed to the first frequency may be p1%, the probability of the UE being redistributed to the second frequency may be p2%, and the probability of the UE being redistributed to the nth frequency may be pn %.

Referring to FIG. 6 (b), for example, when the random value selected by the UE is 0.3, the UE may select the second frequency. For example, when the random value selected by the UE is 0.12, the UE may select the first frequency. Hereinafter, a cell reselection procedure for the UE will be described assuming two cases.

1) Case 1: Suppose that a random value selected by a first UE and a random value selected by a second UE are 0.35. Accordingly, the first UE and the second UE may select the second frequency.

2) Case 2: Suppose that a random value selected by the first UE and a random value selected by the second UE are 0.75. Accordingly, the first UE and the second UE may select the third frequency.

(3) Step 3

The UE may perform cell reselection based on the distribution parameter. When the UE recognizes a cell ranked as the best cell in a selected frequency layer, the UE may consider the selected frequency as the highest priority. For the specified cell belonging to the selected frequency layer, when the UE detects and measures a specified cell having the best ranking in the selected frequency layer, the UE may reselect the specified cell. When the UE detects and measures a cell in a selected frequency layer that is known to have no list of specified cells, the UE may reselect the cell.

1-1) Operation of first UE in case 1: When the first UE selecting the second frequency recognizes a first small cell ranked as the best cell, the first UE may consider the second frequency as the highest priority. Since the UE detects and measures the first small cell specified for the second frequency, the UE may reselect the specified first small cell.

1-2) Operation of second UE in case 2: The second UE selecting the second frequency may not recognize the first small cell. That is, the second UE selecting the second frequency may not detect the specified cell. Therefore, the second UE may stay in an existing first macrocell.

2) Operation of first UE and second UE in case 2: The third frequency does not include the specified cell. Accordingly, when the first UE detects and measures a third macrocell at the third frequency not including the specified cell, the first UE may reselect the third macrocell. When the second UE detects and measures the third macrocell at the third frequency not including the specified cell, the second UE may reselect the third macrocell.

According to the above procedure, the UE performs cell reselection based on a frequency priority, a redistribution factor, and a list of specified cells belonging to a frequency, thereby overcoming the disadvantage of the FPP-based mechanism having difficulty in load distribution in each cell and the disadvantage of the CSP-based mechanism that does not guarantee partial load distribution between different cells.

Hereinafter, a method for a UE to perform frequency measurement on a neighboring frequency having a priority lower than or equal to the priority of a serving frequency will be described according to an embodiment of the present invention.

Even though the cell selection criterion of a serving cell defined by Equation 2 is satisfied, a UE may perform frequency measurement on a neighboring frequency for which a distribution parameter is set. The neighboring frequency may be either an inter-frequency or an inter-RAT frequency. The priority of the neighboring frequency may be lower than or equal to the priority of a serving frequency.

The distribution parameter may be redistributionInterFreqInfo. redistributionInterFreqInfo may include a frequency-specific redistribution factor. redistributionInterFreqInfo may include a list of cells belonging to a specific frequency. redistributionInterFreqInfo may include a cell-specific redistribution factor.

The distribution parameter may be an FPP for each frequency. The FPP may include a frequency-specific priority and a frequency-specific redistribution factor.

The distribution parameter may be an E-FPP for each frequency. The E-FPP may include a frequency-specific priority, a frequency-specific redistribution factor, and a list of cells specified for each frequency. The list of specified cells may additionally be included only when there is a cell specified for a frequency.

(1) When a Redistribution Factor is Set

The UE may perform measurement on a neighbor frequency for which a redistribution factor is set, regardless of whether the serving cell satisfies the cell selection criterion. The neighboring frequency may be either an inter-frequency or an inter-RAT frequency. The priority of the neighboring frequency may be lower than or equal to the priority of the serving frequency. The cell selection criterion may be defined by Equation 2.

Therefore, even though the priority of the neighboring frequency is lower than or equal to the priority of the serving frequency and the serving cell satisfies the cell selection criterion, the UE may perform frequency measurement on the neighboring frequency for which the redistribution factor is set. Accordingly, even though the serving cell satisfies the cell selection criterion, the UE may detect a cell belonging to the neighboring frequency having the priority lower than or equal to that of the serving frequency to which the serving cell belongs.

(2) When a List of Specified Cells is Set

The UE may perform measurement on a neighbor frequency for which a list of specified cells is set, regardless of whether the serving cell satisfies the cell selection criterion. The neighboring frequency may be either an inter-frequency or an inter-RAT frequency. The priority of the neighboring frequency may be lower than or equal to the priority of the serving frequency. The cell selection criterion may be defined by Equation 2.

Therefore, even though the priority of the neighboring frequency is lower than or equal to the priority of the serving frequency and the serving cell satisfies the cell selection criterion, the UE may perform frequency measurement on the neighboring frequency for which the list of specified cells is set. Accordingly, even though the serving cell satisfies the cell selection criterion, the UE may detect a cell belonging to the neighboring frequency having the priority lower than or equal to that of the serving frequency to which the serving cell belongs.

(3) When a Cell-Specific Priority is Set

The UE may perform measurement on a neighbor frequency for which a cell-specific priority is set, regardless of whether the serving cell satisfies the cell selection criterion. The neighboring frequency may be either an inter-frequency or an inter-RAT frequency. The priority of the neighboring frequency may be lower than or equal to the priority of the serving frequency. The cell selection criterion may be defined by Equation 2. The priority of the cell-specific priority may be higher than the frequency priority of the neighboring frequency.

Therefore, even though the priority of the neighboring frequency is lower than or equal to the priority of the serving frequency and the serving cell satisfies the cell selection criterion, the UE may perform frequency measurement on the neighboring frequency for which the cell-specific priority is set. The priority of the cell-specific priority may be higher than the frequency priority of the neighboring frequency. Accordingly, even though the serving cell satisfies the cell selection criterion, the UE may detect a cell belonging to the neighboring frequency having the priority lower than or equal to that of the serving frequency to which the serving cell belongs.

Figure 7:
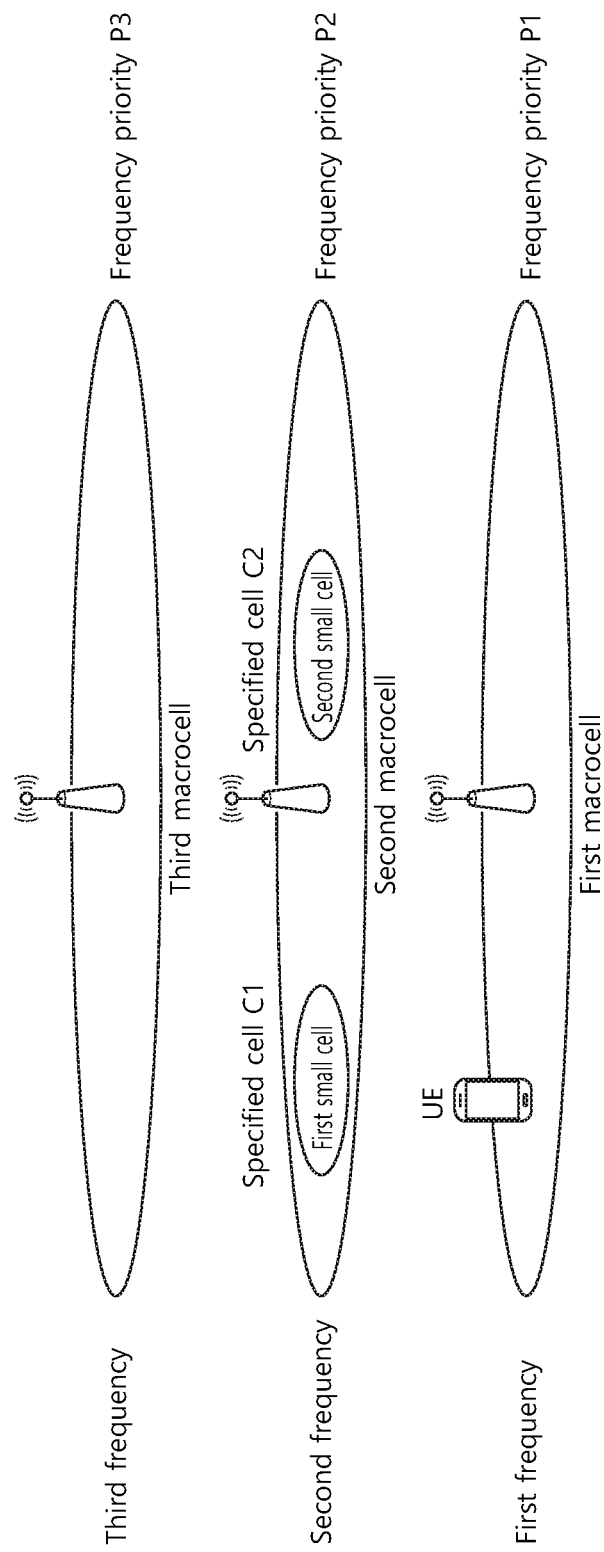
FIG. 7 illustrates a frequency measurement method for a UE to detect a specified cell according to an embodiment of the present invention.

FIG. 7 illustrates a frequency measurement method for a UE to detect a specified cell according to an embodiment of the present invention.

(1) Step 1

A UE may receive a distribution parameters from a network. Referring to FIG. 7, the UE is camping on a first macrocell. The UE may be in the RRC_IDLE state. The UE may receive the distribution parameter. It is assumed that the distribution parameter is provided as follows. The distribution parameter may be broadcast by the first macrocell via system information.

Frequency priority: Frequency priority P1 for first frequency, frequency priority P2 for second frequency, and frequency priority P3 for third frequency (Frequency priority: P1>P2>P3)
Redistribution factor: Redistribution factor 0.3 for first frequency, redistribution factor 0.5 for second frequency, and redistribution factor 0.2 for third frequency
Specified cell: First and second small cells for second frequency (2) Step 2

When the UE receives the distribution parameter from the network, the UE may evaluate which frequency includes the specified cell. Referring to FIG. 7, the UE may know that the second frequency includes the first small cell and the second small cell. Also, the UE may know that the first frequency and the third frequency includes no specified cell.

(3) Step 3

The UE may perform frequency measurement on a neighboring frequency for which a redistribution factor is set. The neighboring frequency for which the redistribution factor is set may be any one of an inter-frequency or an inter-RAT frequency for which redistributionInterFreqInfo is set. The UE may perform measurements on the neighboring frequency for which the redistribution factor is set, regardless of whether a serving cell satisfies a cell selection criterion. Thus, even though the priority of the neighboring frequency is lower than or equal to the priority of a serving frequency and the serving cell satisfies the cell selection criterion, the UE may perform frequency measurement on the neighboring frequency. The cell selection criterion may be defined by Equation 2. Thus, even though the serving cell satisfies the cell selection criterion, the UE may detect a cell belonging to the neighboring frequency having the priority lower than or equal to that of the serving cell.

Alternatively, when the UE detects a list of cells specified for a frequency, the UE may apply a reduced measurement performance group to the frequency.

Alternatively, when the UE detects the list of cells specified for the frequency, the UE may perform measurement even on a frequency having a priority lower than or equal to that of the serving cell despite a signal strength condition of the serving cell (Srxlev>SnonIntraSearchP and Squal>SnonIntraSearchQ).

Even when the UE is assigned a cell-specific priority set by the network, a frequency measurement method for detecting a specified cell may be applied. When the UE receives a cell-specific priority set by the network, the UE may apply a reduced measurement performance group to a frequency according to the cell-specific priority of the frequency and the frequency-specific priority of the frequency. Alternatively, when the UE receives the cell-specific priority set by the network, the UE perform measurement even on a frequency having a priority lower than or equal to that of the serving cell, despite a signal strength condition of the serving cell (Srxlev>SnonIntraSearchP and Squal>SnonIntraSearchQ), according to the cell-specific priority of the frequency and the frequency-specific priority of the frequency. Specifically, when the cell-specific priority of the frequency is higher than the frequency-specific priority of the frequency, the UE may apply the reduced measurement performance group to the frequency. Alternatively, when the cell specific priority of the frequency is higher than the frequency specific priority of the frequency, the UE may perform measurement even on a frequency having a priority lower than or equal to that of the serving cell despite a signal strength condition of the serving cell (Srxlev>SnonIntraSearchP and Squal>SnonIntraSearchQ).

Referring to FIG. 7, the UE may perform frequency measurement on the first frequency, the second frequency, and the third frequency for which the redistribution factor is set. It may not be considered whether the first macrocell satisfies the cell selection criterion in the frequency measurement. For example, when the first macrocell does not satisfy the cell selection criterion, the UE may perform measurement on the second frequency and the third frequency having a low priority. Even though the first macrocell satisfies the cell selection criterion, the UE may perform measurement on the second frequency and the third frequency having low priority. That is, the UE may perform frequency measurement regardless of whether the serving cell satisfies the cell selection criterion for a frequency for which redistributionInterFreqInfo is set. Therefore, the UE may detect a specified cell belonging to the second frequency (for example, the first small cell and the second small cell). According to the conventional measurement rules disclosed in 3GPP TS 36.304, when the serving cell satisfies the cell selection criterion, the UE may not detect the first small cell and the second small cell belonging to the second frequency having a lower priority than that of the first frequency. However, according to the proposed method, even when the serving cell satisfies the cell selection criterion, the UE may detect the first small cell and the second small cell belonging to the second frequency having a lower priority than that of the first frequency.

Alternatively, when the UE recognizes that there are a cell specified for the second frequency (for example, the first small cell and the second small cell), the UE may perform frequency measurement for the second frequency. When the UE receives the distribution parameter, the UE may recognize that there is a cell specified for the second frequency. That is, the UE may perform frequency measurement regardless of whether the serving cell satisfies the cell selection criterion for a frequency for which redistribution-InterFreqInfo is set. Therefore, even when the serving cell satisfies the cell selection criterion, the UE may detect the first small cell and the second small cell belonging to the second frequency having a lower priority than that of the first frequency.

Figure 8:
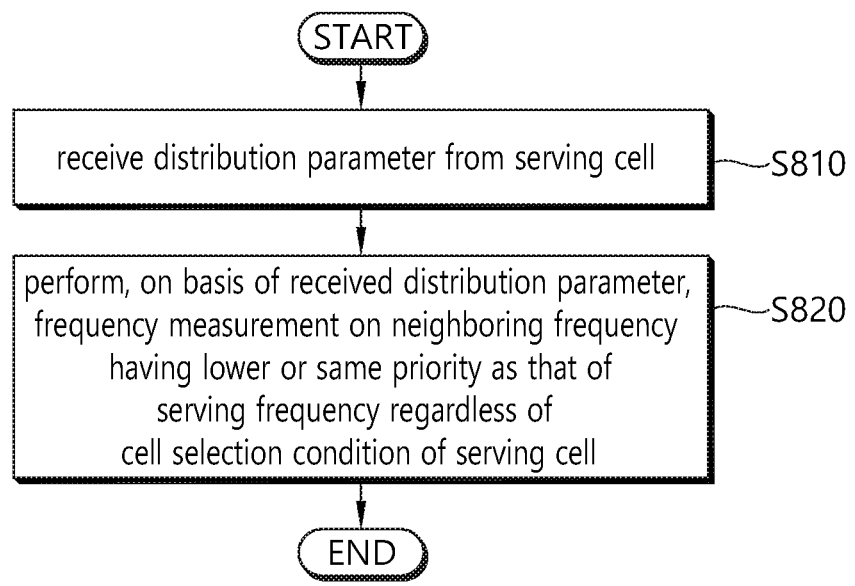
FIG. 8 is a block diagram illustrating a method for a UE to perform frequency measurement according to an embodiment of the present invention.

FIG. 8 is a block diagram illustrating a method for a UE to perform frequency measurement according to an embodiment of the present invention.

Referring to FIG. 8, in step S810, a UE may receive a distribution parameter from a serving cell.

The distribution parameter may be received via a system information block.

In step S820, the UE may perform, based on the received distribution parameter, frequency measurement on a neighboring frequency having a priority lower than or equal to the priority of a serving frequency regardless of a cell selection condition of the serving cell.

The cell selection condition of the serving cell may be a condition such that the cell selection RX level (Srxlev) of the serving cell and the cell selection quality (Squal) of the serving cell have a positive value.

The serving frequency may be a frequency to which the serving cell belongs.

The distribution parameter may include a redistribution factor set for each frequency. The frequency measurement may be performed on a frequency for which the redistribution factor is set. The neighboring frequency may be either an inter-frequency or an inter-RAT frequency. The neighboring frequency may be the frequency for which the redistribution factor is set.

The distribution parameter may include a list of specified cells for each frequency. The frequency measurement may be performed on a frequency to which the specified cells belong. The neighboring frequency may be either an inter-frequency or an inter-RAT frequency. The neighboring frequency may be the frequency to which the specified cells belong.

The distribution parameter may include a frequency-specific priority set for each frequency.

Figure 9:
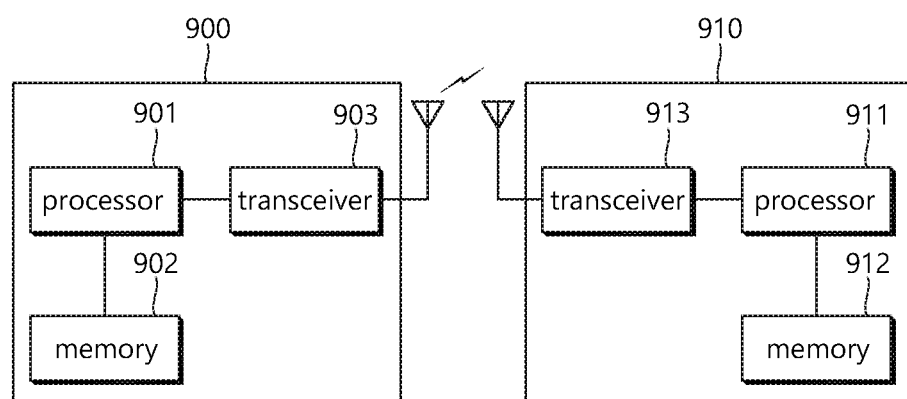
FIG. 9 is a block diagram illustrating a wireless communication system according to the embodiment of the present invention.

FIG. 9 is a block diagram illustrating a wireless communication system according to the embodiment of the present invention.

A BS 900 includes a processor 901, a memory 902 and a transceiver 903. The memory 902 is connected to the processor 901, and stores various information for driving the processor 901. The transceiver 903 is connected to the processor 901, and transmits and/or receives radio signals. The processor 901 implements proposed functions, processes and/or methods. In the above embodiment, an operation of the base station may be implemented by the processor 901.

A UE 910 includes a processor 911, a memory 912 and a transceiver 913. The memory 912 is connected to the processor 911, and stores various information for driving the processor 911. The transceiver 913 is connected to the processor 911, and transmits and/or receives radio signals. The processor 911 implements proposed functions, processes and/or methods. In the above embodiment, an operation of the UE may be implemented by the processor 911.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a wireless device in a wireless communication system, the method comprising:
receiving, from a serving cell on a serving frequency, information for a priority of a neighbor frequency, wherein the priority of the neighbor frequency is equal to or lower than a priority of the serving frequency;
receiving, from the serving cell, a distribution parameter configured for the neighbor frequency, wherein the distribution parameter comprises at least one of a redistribution factor for the neighbor frequency or a list of cells related to the neighbor frequency;
after identifying that the neighbor frequency is configured with the distribution parameter;
based on a cell selection RX level (Srxlev) value of the serving cell exceeding a threshold value $S_{nonIntraSearchP}$, and a cell selection quality (Squal) value of the service cell and exceeding a threshold value $S_{nonIntraSearchQ}$;
performing a frequency measurement on the neighbor frequency of which priority is equal to or lower than the priority of the serving frequency; and
based on that the Srxlev value of the serving cell is equal to or lower than the threshold value $S_{nonIntraSearchP}$ and the Squal value of the serving cell is equal to or lower than the threshold value $S_{nonIntraSearchQ}$, performing a frequency measurement on the neighbor frequency of which priority is equal to or lower than the priority of the serving frequency.

2. The method of claim 1, wherein the neighbor frequency comprises an inter-frequency or an inter-radio access technology (RAT) frequency are received through system information.

3. The method of claim 1, wherein the information for the priority is received through system information.

4. A wireless device in a wireless communication system, comprising:
a memory;
a transceiver; and
at least one processor to connect the memory and the transceiver,
wherein the at least one processor is configured to:
control the transceiver to receive, from a serving cell on a serving frequency, information for a priority of a neighbor frequency,
wherein the priority of the neighbor frequency is equal to or lower than a priority of the serving frequency,
control the transceiver to receive, from the serving cell, a distribution parameter configured for the neighbor frequency,
wherein the distribution parameter comprises at least one of a redistribution factor for the neighbor frequency or a list of cells related to the neighbor frequency, and
after identifying that the neighbor frequency is configured with the distribution parameter;
based on a cell selection RX level (Srxlev) value of the serving cell exceeding a threshold value $S_{nonIntraSearchP}$ and a cell selection quality (Squal) value of the serving cell exceeding a threshold value $S_{nonIntraSearchQ}$, perform a frequency measurement on the neighbor frequency of which priority is equal to or lower than the priority of the serving frequency; and
based on that the Srxlev value of the serving cell is equal to or lower than the threshold value $S_{nonIntraSearchP}$ and the Squal value of the serving cell is equal to or lower than the threshold value $S_{nonIntraSearchQ}$, perform a frequency measurement on the neighbor frequency of which priority is equal to or lower than the priority of the serving frequency.

5. The wireless device of claim 4, wherein the neighbor frequency is an inter-frequency or an inter-radio access technology (RAT) frequency are received through system information.

6. The wireless device of claim 4, wherein the information for the priority is received through system information.

* * * * *